(12) United States Patent
Shih

(10) Patent No.: US 7,045,373 B2
(45) Date of Patent: *May 16, 2006

(54) MANUFACTURING METHOD FOR IN-PLANE SWITCHING MODE LCD UNIT WITH FEWER MASKING PROCESS

(75) Inventor: Po-Sheng Shih, Taoyuan Shien (TW)

(73) Assignee: Hannstar Display Corp., Taipei (TW)

( * ) Notice: Subject to any disclaimer, the term of this patent is extended or adjusted under 35 U.S.C. 154(b) by 62 days.

This patent is subject to a terminal disclaimer.

(21) Appl. No.: 10/850,667

(22) Filed: May 20, 2004

(65) Prior Publication Data

US 2004/0214360 A1    Oct. 28, 2004

Related U.S. Application Data

(63) Continuation-in-part of application No. 10/157,453, filed on May 28, 2002, now Pat. No. 6,757,041.

(30) Foreign Application Priority Data

Sep. 25, 2001    (TW) ............................... 90123652 A

(51) Int. Cl.
   *H01L 21/00* (2006.01)
   *H01L 29/04* (2006.01)
(52) U.S. Cl. ..................... 438/30; 438/149; 438/155; 257/59; 257/72
(58) Field of Classification Search .................. 438/30, 438/149, 155, 151; 257/72, 59
See application file for complete search history.

(56) References Cited

U.S. PATENT DOCUMENTS

| | | | |
|---|---|---|---|
| 5,760,854 A | 6/1998 | Ono et al. | 349/38 |
| 5,781,254 A | 7/1998 | Kim et al. | 349/44 |
| 5,825,449 A * | 10/1998 | Shin | 349/148 |
| 5,940,151 A | 8/1999 | Ha | 349/43 |
| 6,091,466 A | 7/2000 | Kim et al. | 349/43 |
| 6,207,480 B1 * | 3/2001 | Cha et al. | 438/149 |
| 6,486,933 B1 * | 11/2002 | Cha et al. | 349/139 |
| 6,696,324 B1 * | 2/2004 | Hong et al. | 438/149 |
| 6,757,041 B1 * | 6/2004 | Shih | 349/141 |
| 2002/0019082 A1 * | 2/2002 | Wong | 438/149 |

* cited by examiner

*Primary Examiner*—Michael Trinh
(74) *Attorney, Agent, or Firm*—Haverstock & Owens LLP

(57) ABSTRACT

A manufacturing method for an in-plane switching mode liquid crystal display (LCD) unit is provided. The method includes steps of: providing a substrate, forming a first conductive layer on the substrate, patterning the first conductive layer to form a gate line, a comb-shaped first electrode, a wiring pad, and a comb-shaped second electrode by a first photo etching process, forming a first insulation layer and a first semi-conductive layer, patterning the first insulation layer and the first semi-conductive layer to form a channel, an insulation structure, a dielectric layer, and plural crossed-conductive line insulation structures by a second photo etching process, forming a second semi-conductive layer and a second conductive layer on the substrate, patterning the second semi-conductive layer and the second conductive layer to form a source/drain electrode, a data line, a connecting electrode, and a first electrode by a third photo etching process, and forming a passivation layer.

29 Claims, 19 Drawing Sheets

MANUFACTURING METHOD FOR IN-PLANE SWITCHING MODE LCD UNIT WITH FEWER MASKING PROCESS

This application is a Continuation-In-Part of application Ser. No. 10/157,453, filed May 28, 2002, granted on Jun. 29, 2004 and bearing U.S. Pat. No. 6,757,041.

FIELD OF THE INVENTION

The present invention is related to a manufacturing method for a liquid crystal display (LCD) unit, and more particularly to a manufacturing method for an in-plane switching mode liquid crystal display (LCD) unit.

BACKGROUND OF THE INVENTION

As the technique is developing, it is the trend that the liquid crystal display (LCD) takes the place of the conventional picture tube display and becomes the main stream in the market. Please refer to FIG. 1(a). FIG. 1(a) is a diagram illustrating the circuit of a pixel unit in a liquid crystal display according to the prior art. It is composed of a display unit 12, a storage capacitor 13, and a switching unit accomplished by a thin film transistor 11. Regarding the structure of the display unit 12, it is mainly divided into two types at present. The common structure is a twisted nematic liquid crystal display (TN-LCD), as shown in FIG. 1(b). In FIG. 1(b), the data electrode 121 and the common electrode 122 are mounted at both sides of the liquid crystal molecule 123. The cell gap between the upper and lower glasses is "d." Through controlling the potential difference between the data electrode 121 and the common electrode 122 (the direction of the electric field is shown in a dotted line in the diagram), the liquid crystal molecule 123 can stand erect to form the included angle between the liquid crystal molecule 123 and the Z-axis. Therefore, the light-pervious rate will follow to be changed according to the included angle and the pixel brightness can be controlled. However, due to the rotation way of the liquid crystal molecule in the above display unit structure, the distribution of plural refractions is very different while the watcher has different visual angles, for example, in the inclined directions of A–A' and B–B' (as shown in FIG. 1(b)). Besides, the pervious rate will be very different and the disadvantage that the bigger visual angle cannot be provided will be existed. Therefore, the above display unit structure has its limitation indeed, especially that the superficial size of the display panel is getting increased at the present time.

Compared with the second type structure (TN-LCD), the first type structure (TN-LCD) has the disadvantage that the rotation way of the liquid crystal molecule has a smaller visual angle. On the contrary, the display unit structure 12 in the second type has a better range of visual angle. Please refer to FIG. 1(c). FIG. 1(c) is a diagram illustrating the display unit structure 12 of an in-plane switching mode (IPS mode) according to the prior art. It is clear in the diagram that the data electrode 121 and the common electrode 122 are mounted at the same side of the liquid crystal molecule 123. Therefore, while the potential difference between the data electrode 121 and the common electrode 122 is changed (the direction of the electric field is shown in a dotted line in the diagram), the liquid crystal molecule 123 will take Z-axis as the axle center and rotate around it. The light-pervious rate will follow to be changed and the pixel brightness control will be accomplished. The rotation way of the liquid crystal molecule in this kind of display unit structure will not have a light-pervious rate change while the watcher has different visual angles. Therefore, it has the advantage that a bigger visual angle can be provided, and it will help a lot for manufacturing the display panel with bigger size.

Please refer to FIGS. 2(a) and 2(b). FIG. 2(a) is a top view showing the pixel unit structure of the in-plane switching mode (IPS mode) in the first conventional thin film transistor LCD according to the prior art. FIG. 2(b) is a sectional view along the A–B line segment showing the pixel unit structure of the in-plane switching mode (IPS mode) in the first conventional thin film transistor LCD according to the prior art. The pixel unit structure is accomplished by the following process:

(a) forming a first metal layer on the substrate 20 and defining thereon a gate line 21, a common electrode 22 of the display unit, and a wiring pad 23 needed for the periphery (the first photo etching process (PEP)).

(b) depositing a gate insulation layer 24, a semi-conductive layer, and a relatively high doped semi-conductive layer, and additionally, defining a channel structure 25 (the second photo etching process (PEP)).

(c) forming a second metal layer and defining a source/drain electrode region 26 of thin film transistor, a data line 27, and pixel electrode 28 of the display unit (the third photo etching process (PEP)).

(d) depositing a passivation layer 29 and defining a contact window 231 on the wiring pad 23 (the fourth photo etching process (PEP)).

It is clear in FIGS. 2(a) and 2(b) that the common electrode 22 and pixel electrode 28 of the display unit are respectively accomplished from the first metal layer and the second metal layer, which forms two flats with different altitudes. Therefore, the curve of the data voltage and the pervious rate is asymmetric, as shown in FIG. 2(c). Besides, the display image will have the drawbacks of image-sticking and flicker. Since the common electrode 22 and pixel electrode 28 of the display unit are respectively accomplished from the first metal layer and the second metal layer in two different photo etching processes, the two electrodes will unavoidably have the problem of misalignment, which will cause uneven light-pervious rate and mura, as shown in FIG. 2(C) that V1 is not equal to V2.

In order to improve the above drawbacks, another conventional pixel unit structure is developed, as shown in FIG. 3. FIG. 3(a) is a top view showing the pixel unit structure of the in-plane switching mode (IPS mode) in the second conventional thin film transistor LCD according to the prior art. FIG. 3(b) is a sectional view along the A–B line segment showing the pixel unit structure of the in-plane switching mode (IPS mode) in the second conventional thin film transistor LCD according to the prior art. The pixel unit structure is accomplished by the following process:

(a) forming a first metal layer on the substrate 30 and defining thereon a gate line 31, a common electrode 32 of the display unit, a lower electrode 320 for storing capacitance, and a wiring pad 33 needed for the periphery (the first photo etching process (PEP)).

(b) depositing a gate insulation layer 34, a semi-conductive layer, and a relatively high doped semi-conductive layer, and additionally, defining a channel structure 35 (the second photo etching process (PEP)).

(c) forming a second metal layer and defining a source/drain electrode region 36 of thin film transistor, a data line 37, and an upper electrode 38 for storing capacitance (the third photo etching process (PEP)).

(d) depositing a passivation layer 39 and respectively defining contact windows 331, 381, and 321 on the wiring pad 33, the upper electrode 38 for storing capacitance, and the common electrode 32 (the fourth photo etching process (PEP)).

(e) forming a third metal layer and defining two comb-shaped electrodes 382 and 322 to have electric contact with the upper electrode 38 and the common electrode 32 through the contact windows 381 and 321 respectively (the fifth photo etching process (PEP)).

It is known from the above description that the two comb-shaped electrodes 382 and 322 are accomplished at the flats with same altitudes in the same photo etching process. Since there is no altitude difference between the two comb-shaped electrodes 382 and 322, it will not result in the problem of misalignment. Although the drawback of the former technique is solved, however, the steps of the photo etching process (PEP) are too many, which will lower the yield efficiency and increase the cost. Hence, how to rectify the foresaid conventional drawback has become the main purpose of the present invention.

SUMMARY OF THE INVENTION

It is an object of the present invention to provide a manufacturing method for an in-plane switching mode liquid crystal display (LCD) unit with reduced steps of the photo etching process (PEP).

It is another object of the present invention to provide a manufacturing method for an in-plane switching mode liquid crystal display (LCD) unit to reduce the manufacturing cost and increase the yield efficiency.

According to the present invention, a manufacturing method for in-plane switching mode liquid crystal display (LCD) unit includes steps of: providing a substrate; forming a first conductive layer on the substrate; forming a first conductive structure comprising a gate line, a comb-shaped first electrode, a wiring pad, and a comb-shaped second electrode by etching the first conductive layer; forming an intermediate structure comprising a channel structure, an insulation structure, a dielectric layer for storing capacitance, and a plurality of crossed-conductive line insulation structures on the first conductive structure; and forming a second conductive structure comprising a source electrode, a drain electrode, a data line, a connecting electrode, and a first electrode for storing capacitance on said intermediate structure.

Preferably, the crossed-conductive line insulation structures is formed at the cross of said gate line, said comb-shaped first electrode and said data line.

Preferably, the data line covers the crossed-conductive line insulation structures, and connects the drain electrode.

Preferably, the connecting electrode connects the source electrode and the comb-shaped second electrode.

In accordance with the present invention, the step of forming a passivation layer further comprises the step of: patterning the passivation layer by a fourth photo etching process (PEP), wherein the passivation layer having a wiring hole on the wring pad.

Preferably, the gate insulation layer is made of a material selected from of a group consisted of silicon nitride ($SiN_x$), silicon oxide ($SiO_x$), silicon oxynitride ($SiO_xN_y$), tantalum oxide ($TaO_x$), aluminum oxide ($AlO_x$) and the combination thereof.

Preferably, the first electrode for storing capacitance covers the dielectric layer for storing capacitance, and connects the comb-shaped second electrode.

Preferably, the first semi-conductive layer is made of a material selected from of a group consisted of intrinsic amorphous silicon, intrinsic micro-crystalline silicon, and intrinsic polycrystalline silicon.

Preferably, the step of forming the intermediate structure further comprises a step of: forming a first insulation layer and a first semi-conductive layer on the a portion of the first conductive structure, wherein the intermediate structure is formed by patterning the first insulation layer, and the first semi-conductive layer.

Preferably, the step of forming the second conductive structure further comprises a step of: forming a second semi-conductive layer and a second conductive layer on the substrate, wherein the second conductive structure is formed by patterning the second semi-conductive layer and the second conductive layer.

Preferably, the second semi-conductive layer has relatively high doped than the first semi-conductive layer.

Preferably, the step of forming the intermediate structure further comprises a step of: forming a first insulation layer, a first semi-conductive layer and a second semi-conductive layer on the substrate, wherein the intermediate structure is formed by patterning the first insulation layer, the first semi-conductive layer and the second semi-conductive layer.

Preferably, the step of forming the second conductive structure further comprises a step of: forming a second conductive layer on the substrate, wherein the second conductive structure is formed by patterning the second semi-conductive layer and the second conductive layer.

Preferably, the second semi-conductive layer has relatively high doped than the first semi-conductive layer.

Preferably, the dielectric layer for storing capacitance covers thereon a lower electrode under an storage capacitor of the comb-shaped common electrode structure.

Preferably, the manufacturing method further comprising a step of forming a passivation structure on the substrate except partial region of the wiring pad.

Preferably, the step of forming the passivation structure further comprises a step of: forming a passivation layer on the substrate; and patterning the passivation layer to form the passivation structure, wherein the passivation structure having a wiring hole on the wring pad.

Preferably, the step of forming the passivation structure further comprises a step of: forming the passivation structure on the substrate except partial region of the wiring pad by a mask deposition method to generate a wiring hole on the wiring pad.

Preferably, a thin film transistor array substrate structure for liquid crystal display comprising: a substrate; a first conductive structure comprising a gate line, a comb-shaped first electrode, a wiring pad, and a comb-shaped second electrode; an intermediate structure on said first conductive structure comprising a channel structure, an insulation structure, a dielectric layer for storing capacitance, and a plurality of crossed-conductive line insulation structures; and a second conductive structure on the intermediate structure comprising a source electrode, a drain electrode, a data line, a connecting electrode, and a first electrode for storing capacitance, wherein the first conductive structure is formed by etching a first conductive layer on the substrate.

Preferably, the crossed-conductive line insulation structures is formed at the cross of the gate line, the comb-shaped first electrode and the data line.

Preferably, the data line covers the crossed-conductive line insulation structures, and connects the drain electrode.

Preferably, the connecting electrode connects the source electrode and the comb-shaped second electrode.

Preferably, the first electrode for storing capacitance covers the dielectric layer for storing capacitance, and connects the comb-shaped second electrode.

Preferably, the thin film transistor array substrate structure further comprising a passivation structure on second conductive structure except partial region of the wiring pad.

Preferably, the comb-shaped first electrode is cross and parallel with the comb-shaped second electrode.

Preferably, the comb-shaped second electrode is a pixel electrode.

Preferably, the intermediate structure is formed by patterning a first insulation layer, and a first semi-conductive layer.

Preferably, the second conductive structure is formed by patterning a second semi-conductive layer and a second conductive layer.

Preferably, the second semi-conductive layer has relatively high doped than the first semi-conductive layer.

Preferably, the intermediate structure is formed by patterning a first insulation layer, a first semi-conductive layer and a second semi-conductive layer.

Preferably, the second conductive structure is formed by patterning the second semi-conductive layer and a second conductive layer.

Preferably, the second semi-conductive layer has relatively high doped than the first semi-conductive layer.

The foregoing and other features and advantages of the present invention will be more clearly understood through the following descriptions with reference to the drawings, wherein:

DETAILED DESCRIPTION OF THE PREFERRED EMBODIMENT

Figure 1A:
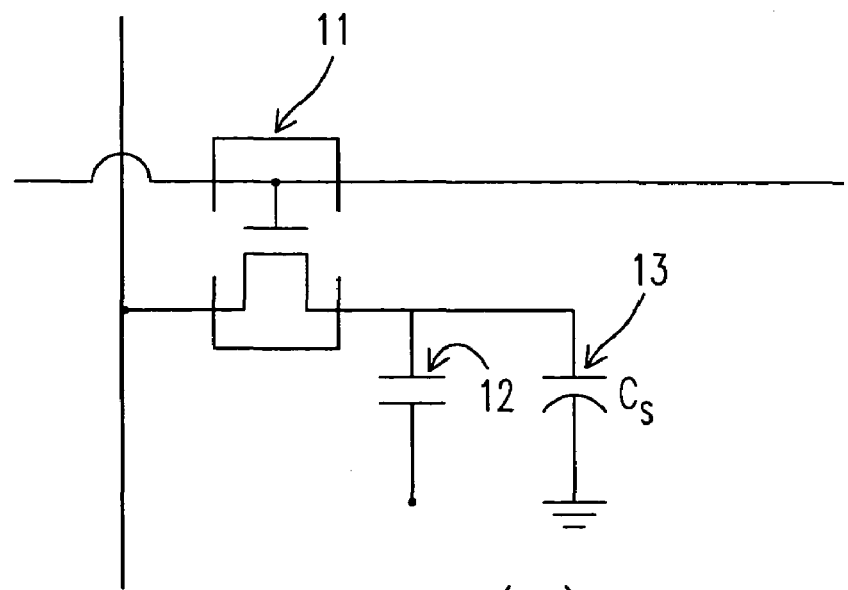
FIG. 1(a) is a diagram illustrating the circuit of a pixel unit in a liquid crystal display according to the prior art.
Figure 1B:
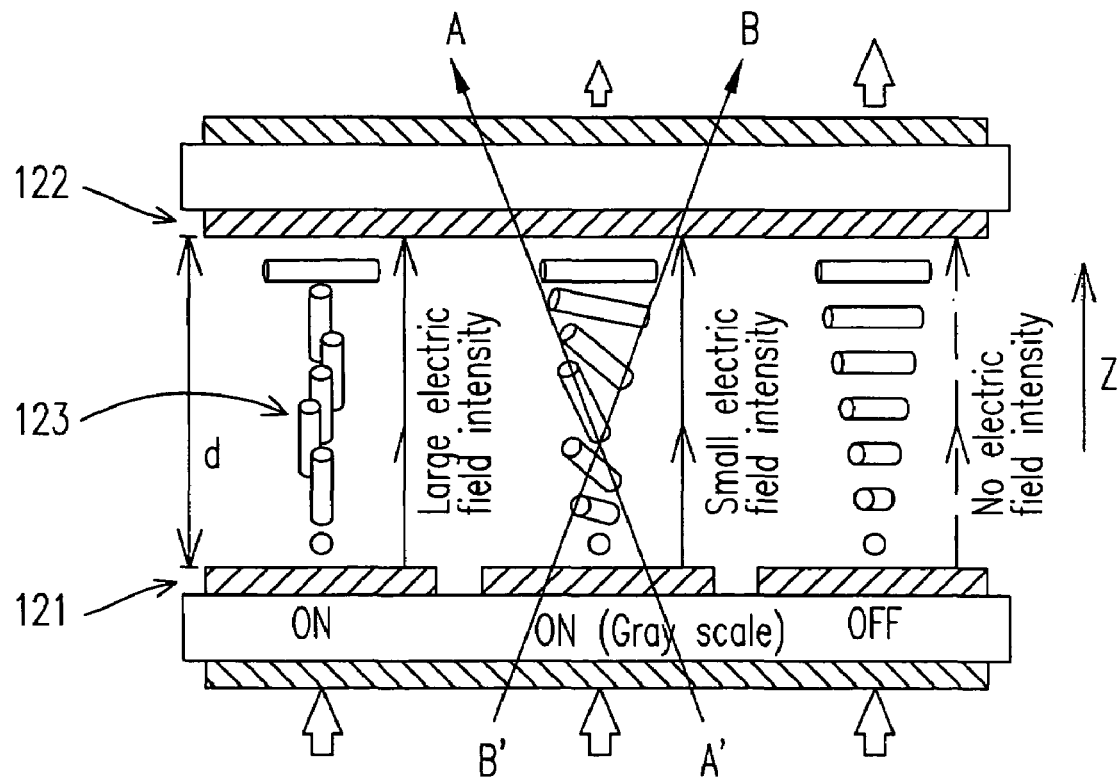
FIGS. 1(b) and (c) are diagrams illustrating the display unit structures belonged to two types according to the prior art.
Figure 1C:
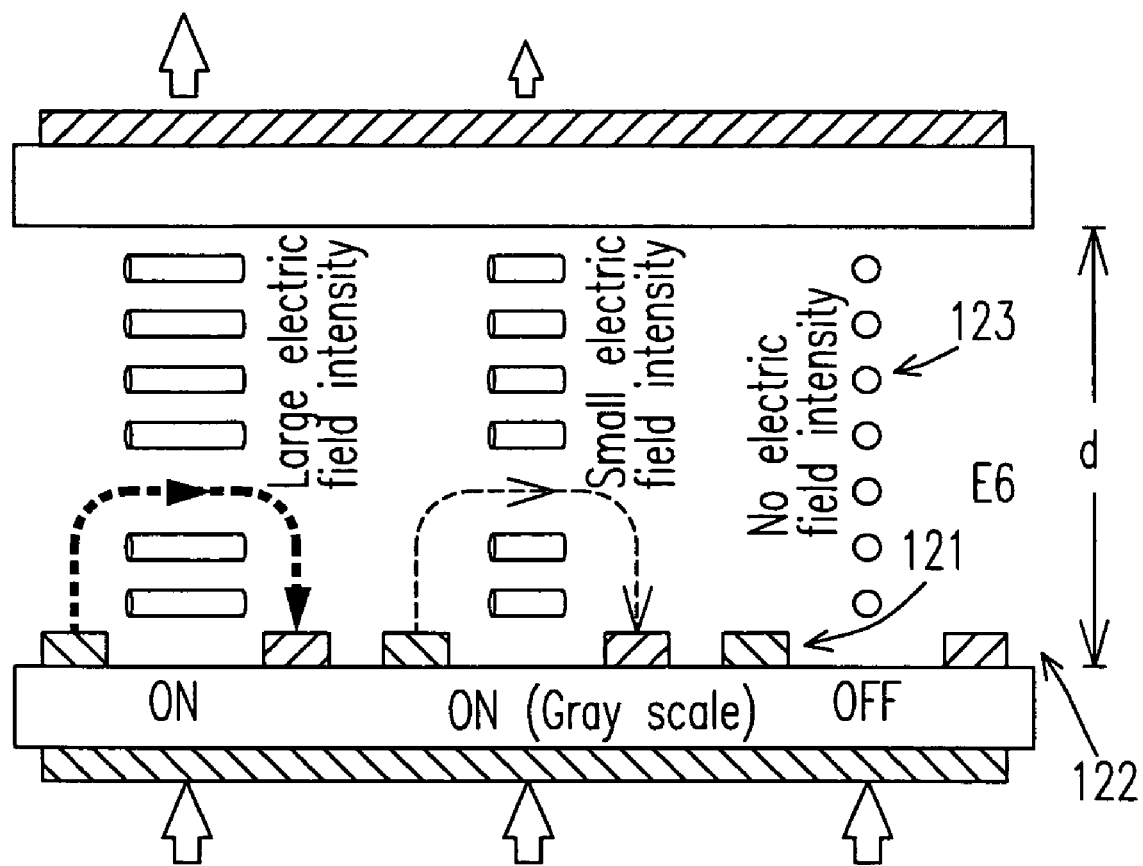
Figure 2A:
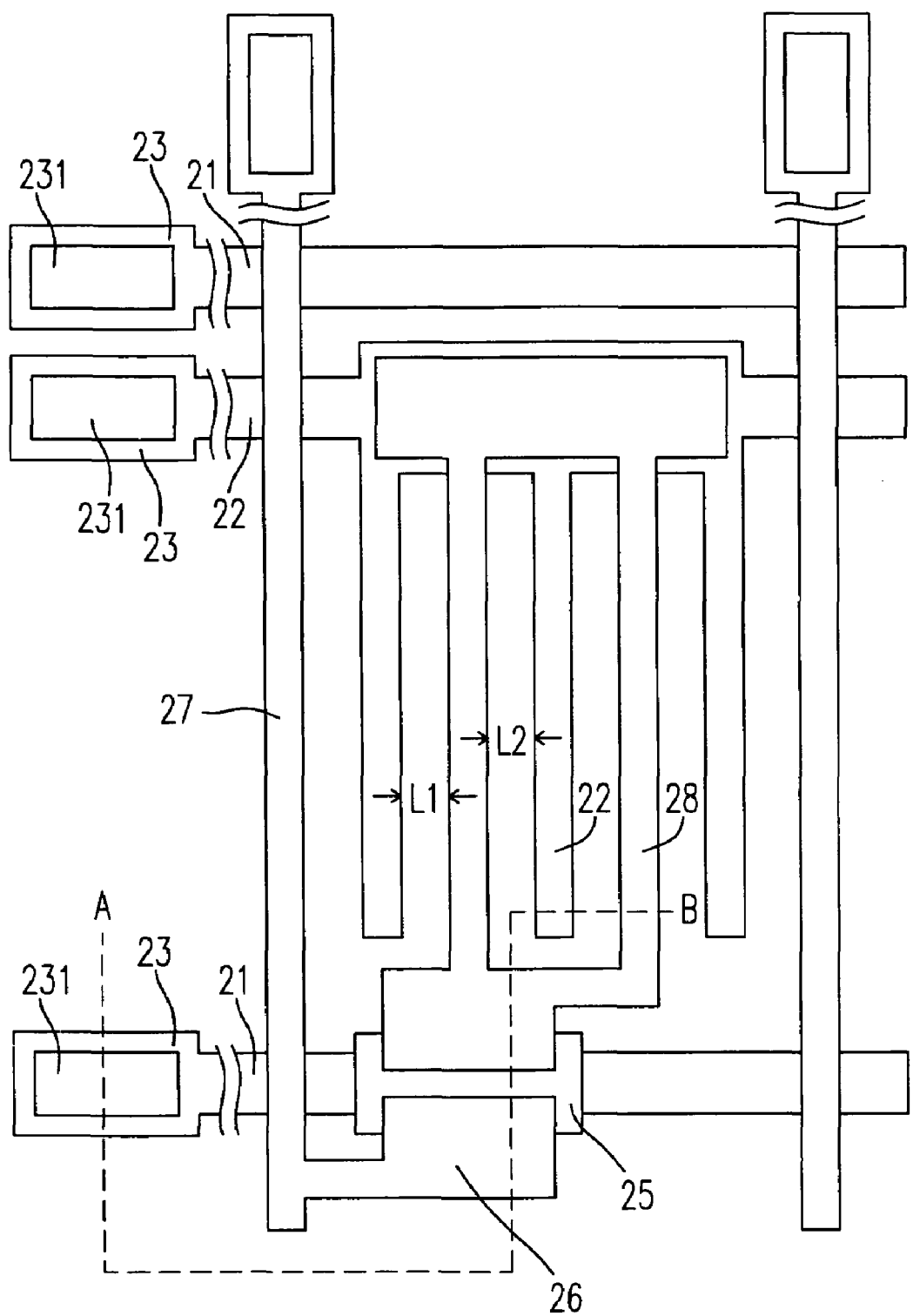
FIG. 2(a) is a top view showing the pixel unit structure of the in-plane switching mode (IPS mode) in the first conventional thin film transistor LCD according to the prior art.
Figure 2B:
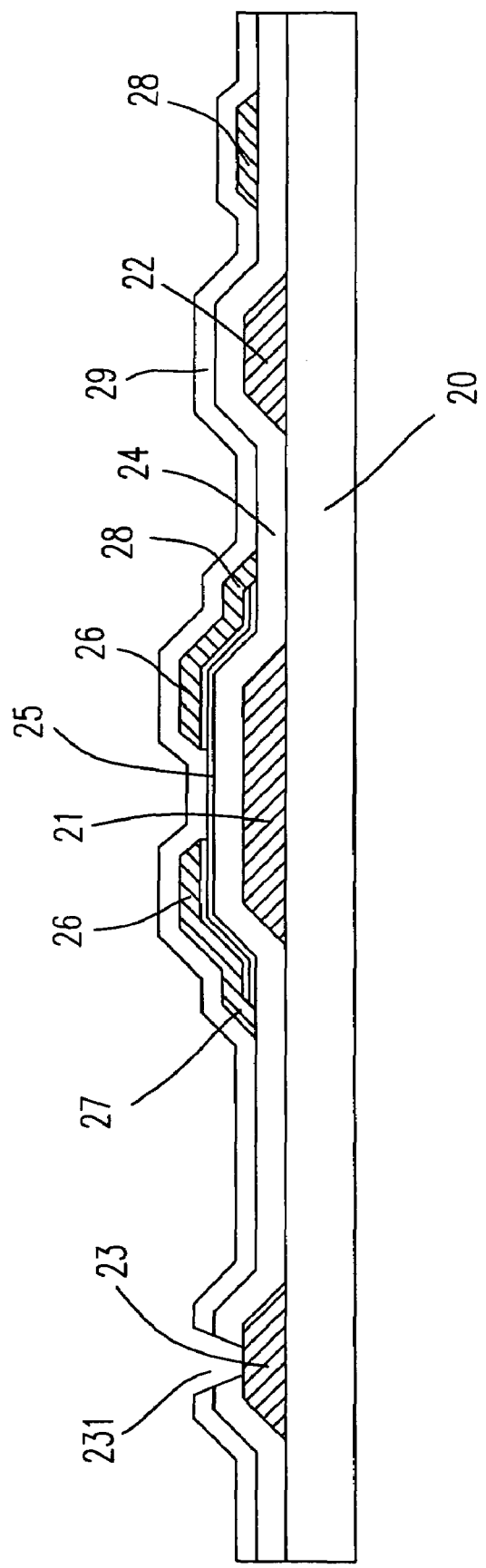
FIG. 2(b) is a sectional view along the A–B line segment showing the pixel unit structure of the in-plane switching mode (IPS mode) in the first conventional thin film transistor LCD according to the prior art.
Figure 2C:
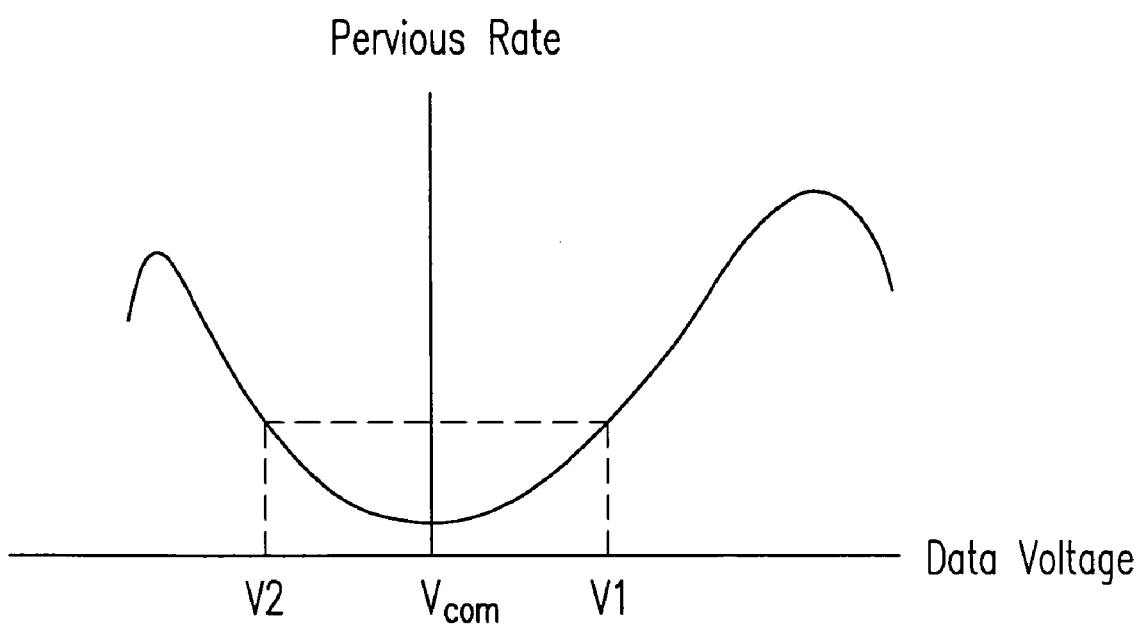
FIG. 2(c) is a diagram illustrating the asymmetric curve of the data voltage and the penetrating rate in the first conventional thin film transistor LCD according to the prior art.
Figure 3A:
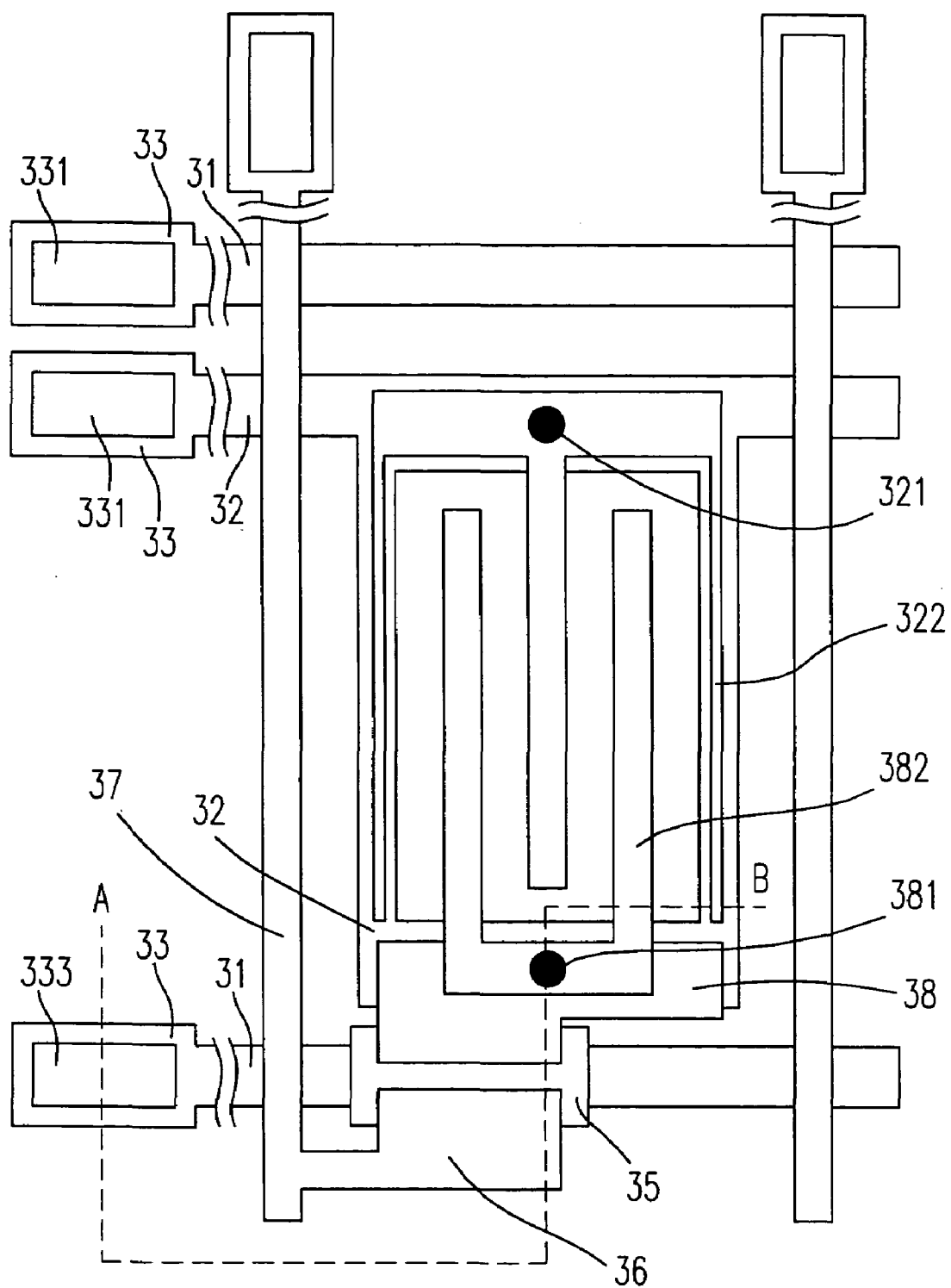
FIG. 3(a) is a top view showing the pixel unit structure of the in-plane switching mode (IPS mode) in the second conventional thin film transistor LCD according to the prior art.
Figure 3B:
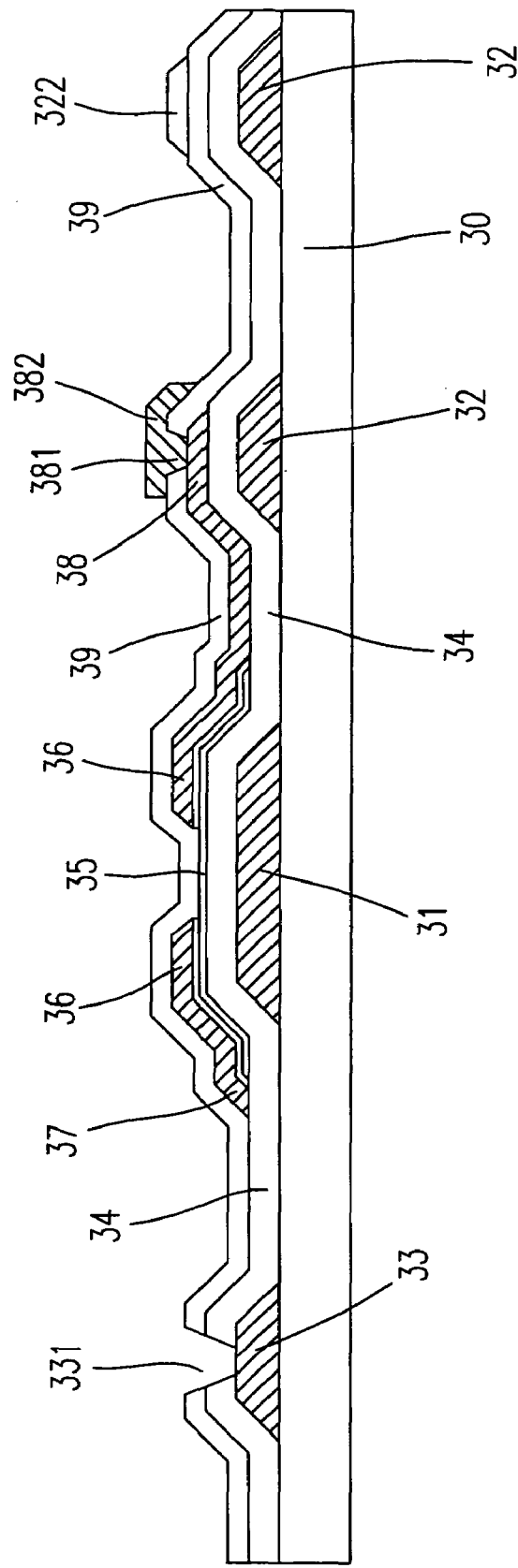
FIG. 3(b) is a sectional view along the A–B line segment showing the pixel unit structure of the in-plane switching mode (IPS mode) in the second conventional thin film transistor LCD according to the prior art.
Figure 4A:
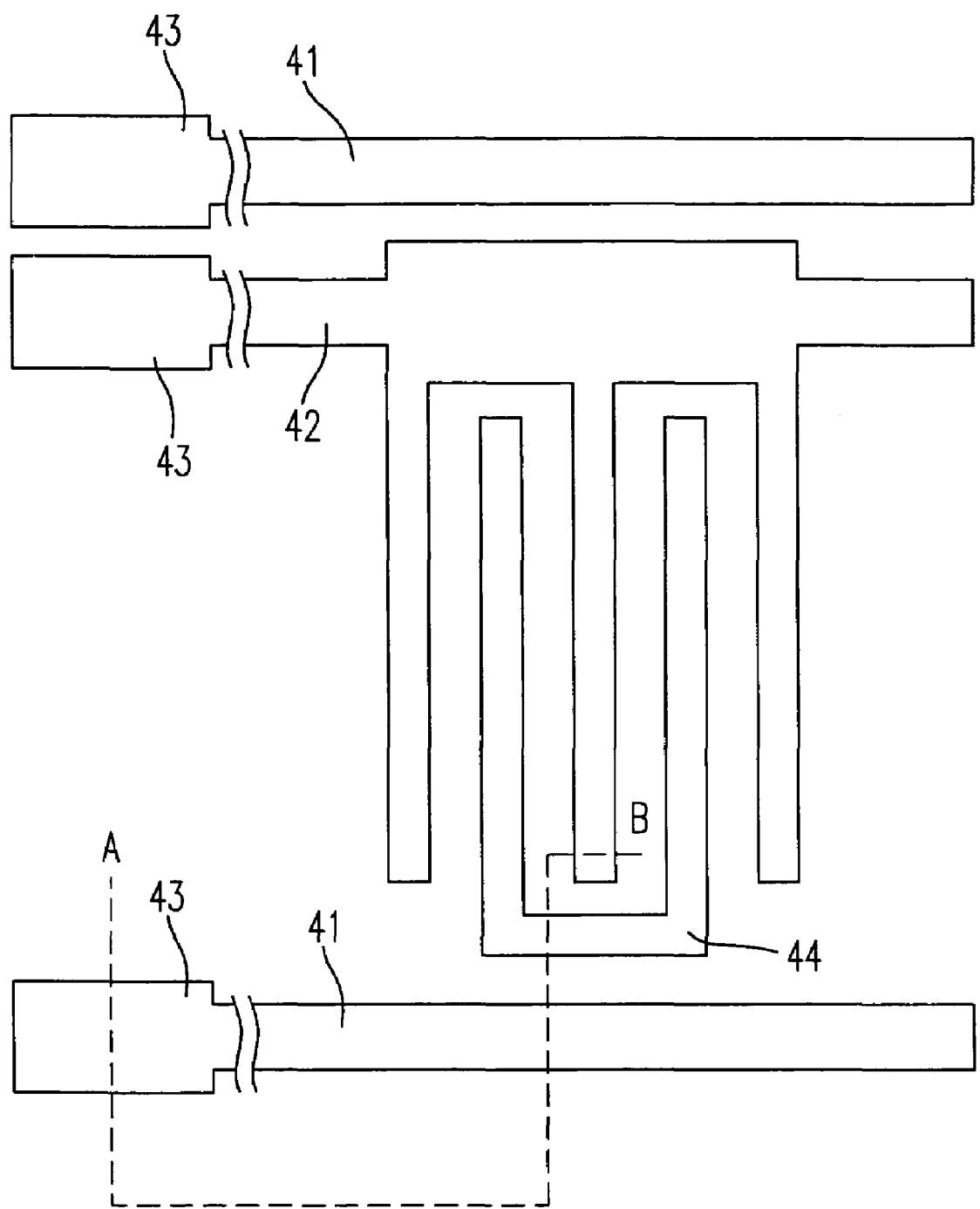
FIGS. 4(a)–(h) are diagrams illustrating the structures and manufacturing processes of the in-plane switching mode liquid crystal display (LCD) unit according to a preferred embodiment of the present invention.
Figure 4B:
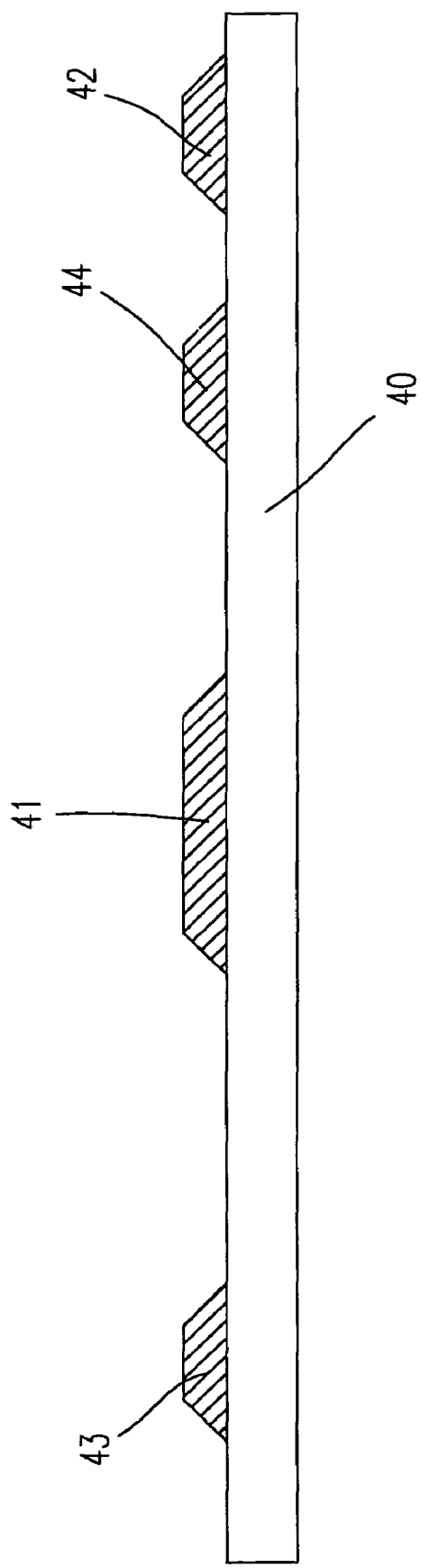
Figure 4C:
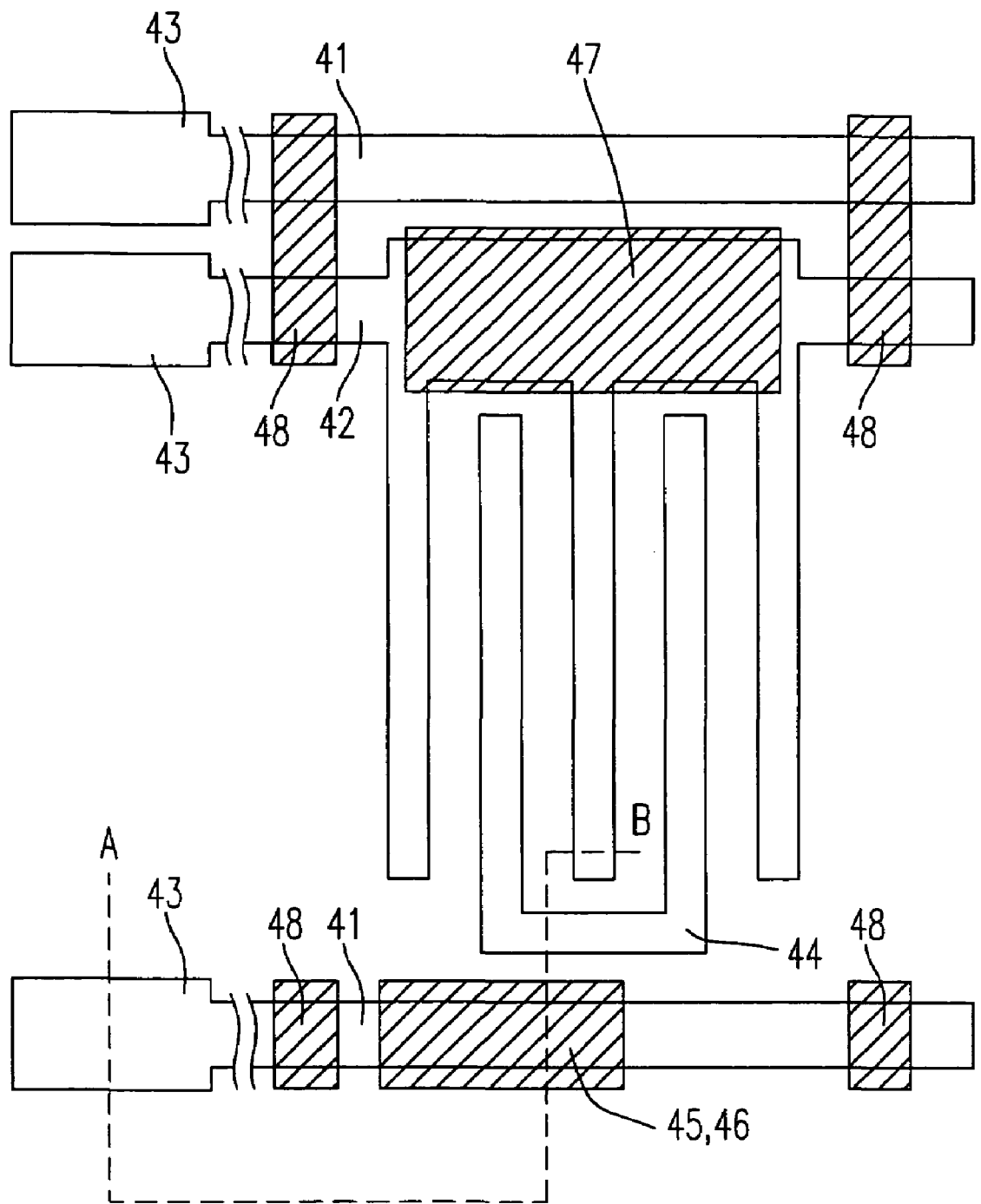
Figure 4D:
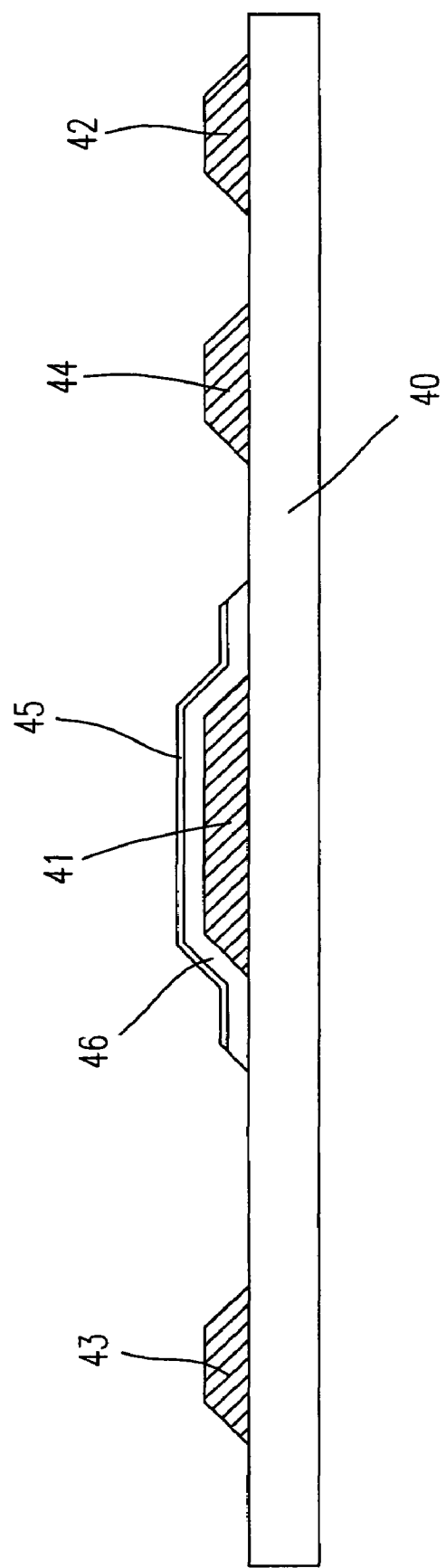
Figure 4E:
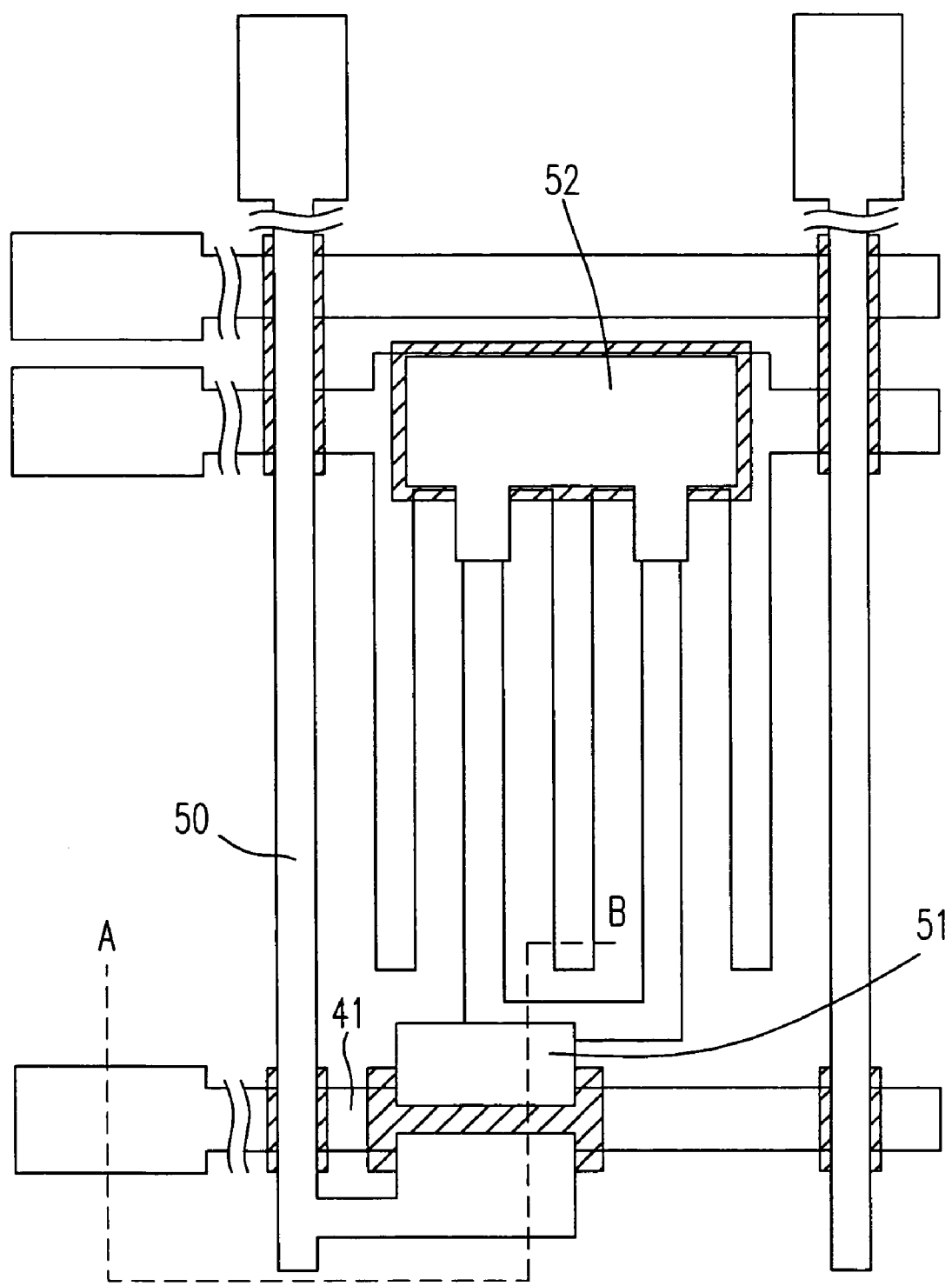
Figure 4F:
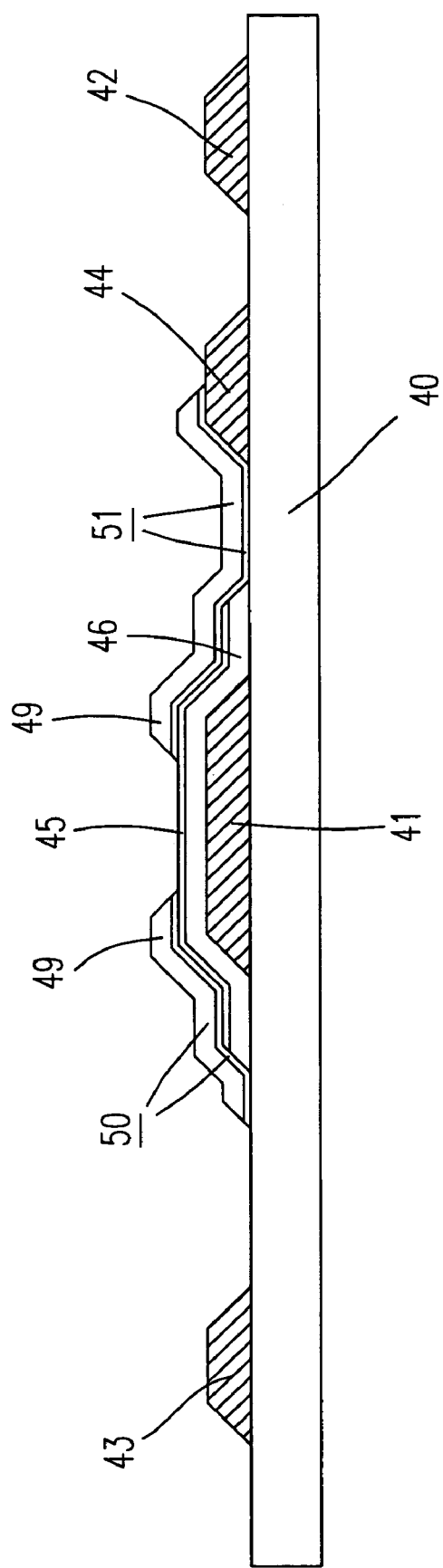
Figure 4G:
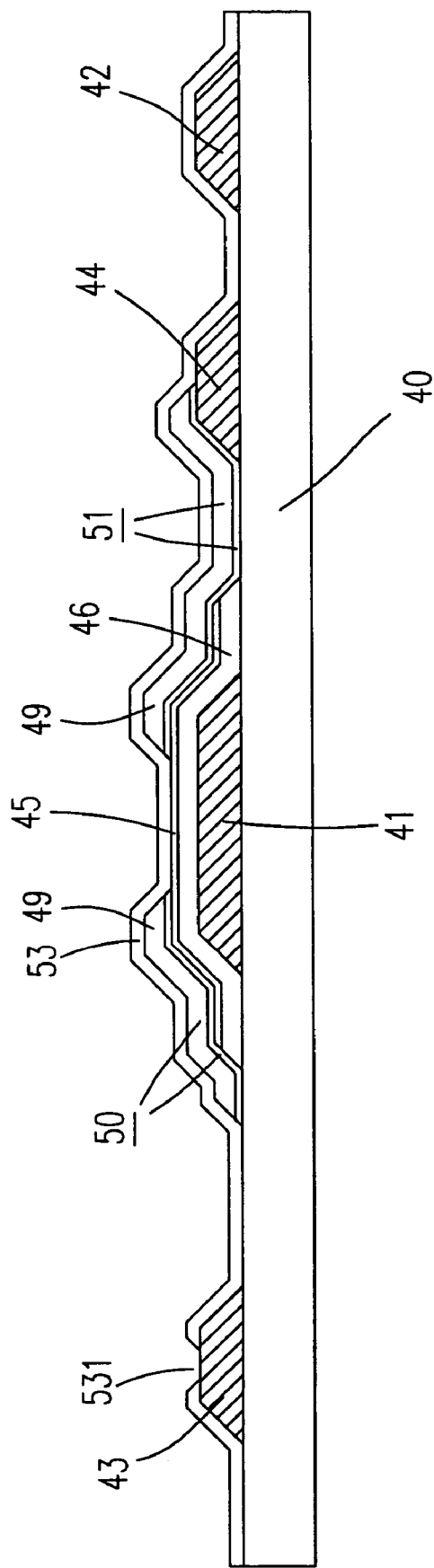
Figure 4H:
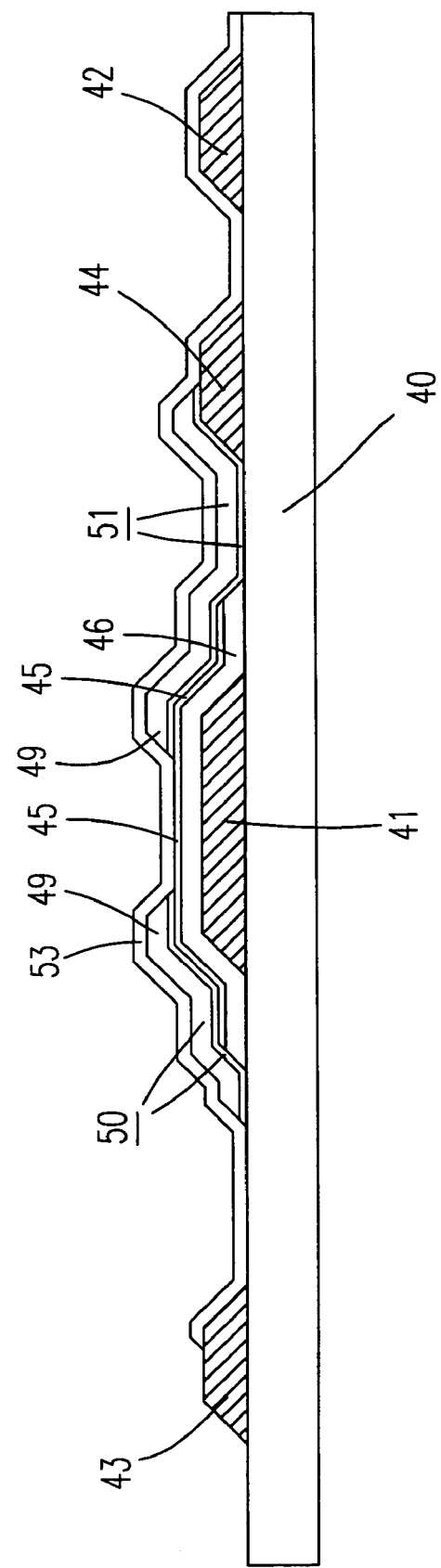

In order to improve the conventional technique, a manufacturing method for the in-plane switching mode liquid crystal display (LCD) unit with reduced steps is developed in the present invention. Please refer to FIGS. 4(a)–(h). FIGS. 4(a)–(h) are diagrams illustrating the structures and manufacturing processes of the in-plane switching mode liquid crystal display (LCD) unit according to a preferred embodiment of the present invention. In FIG. 4(a), an insulation substrate 40 is provided, and a first conductive layer is formed on the insulation substrate 40. Afterward, a first conductive structure including a gate line structure 41, a comb-shaped common electrode structure 42, a wiring pad 43, and a comb-shaped pixel electrode 44 is defined by the first photo etching process (PEP). The sectional view along the A–B line segment is shown in FIG. 4(b). In FIG. 4(c), a gate insulation layer and a semi-conductive layer are formed on the insulation substrate 40 in sequence. Then, the intermediate structure including the channel structure 45, the insulation structure 46, the dielectric layer 47 for storing capacitance, and plural crossed-conductive line insulation structures 48 are defined by the second photo etching process (PEP). Nevertheless, the dielectric layer 47 for storing capacitance covers the lower electrode which is disposed in the comb-shaped common electrode structure 42 for storing capacitance. The sectional view along the A–B line segment is shown in FIG. 4(d). In FIG. 4(e), a relatively high doped semi-conductive layer and a second conductive layer are formed on the insulation substrate, and a second conductive structure including a source/drain electrode structure 49, a data line 50, a connecting electrode 51, and an upper electrode 52 for storing capacitance is defined thereon by the third photo etching process (PEP). Nevertheless, the data line 50 covers the crossed-conductive line insulation structure 48 and connects the drain electrode structure. The connecting electrode 51 is connected between the source electrode structure and the comb-shaped pixel electrode 44. The upper electrode 52 covers the dielectric layer 47 and connects the comb-shaped pixel electrode 44. The sectional view along the A–B line segment is shown in FIG. 4(f). Additionally, a passivation structure 53 is formed on the insulation substrate 40, except partial region of the wiring pad 43. The forming way of the passivation structure 53 can be chosen form one of the following two ways. The first way is shown in FIG. 4(g). After forming a passivation layer on the insulation substrate 40, the passivation layer is defined by the fourth photo etching process (PEP). Then the passivation structure 53 with the wiring hole 531 on the wring pad 43 is formed. The second way is shown in FIG. 4(h). The passivation structure is directly formed by a mask deposition method. Since the mask above the wring pad 43 is hollow, the region around substrate can be covered. Without the need of the fourth photo etching process (PEP), the passivation structure 53 can be directly formed on the insulation substrate 40, except partial region of the wiring pad 43, where is the region for connecting lines.

Figure 5A:
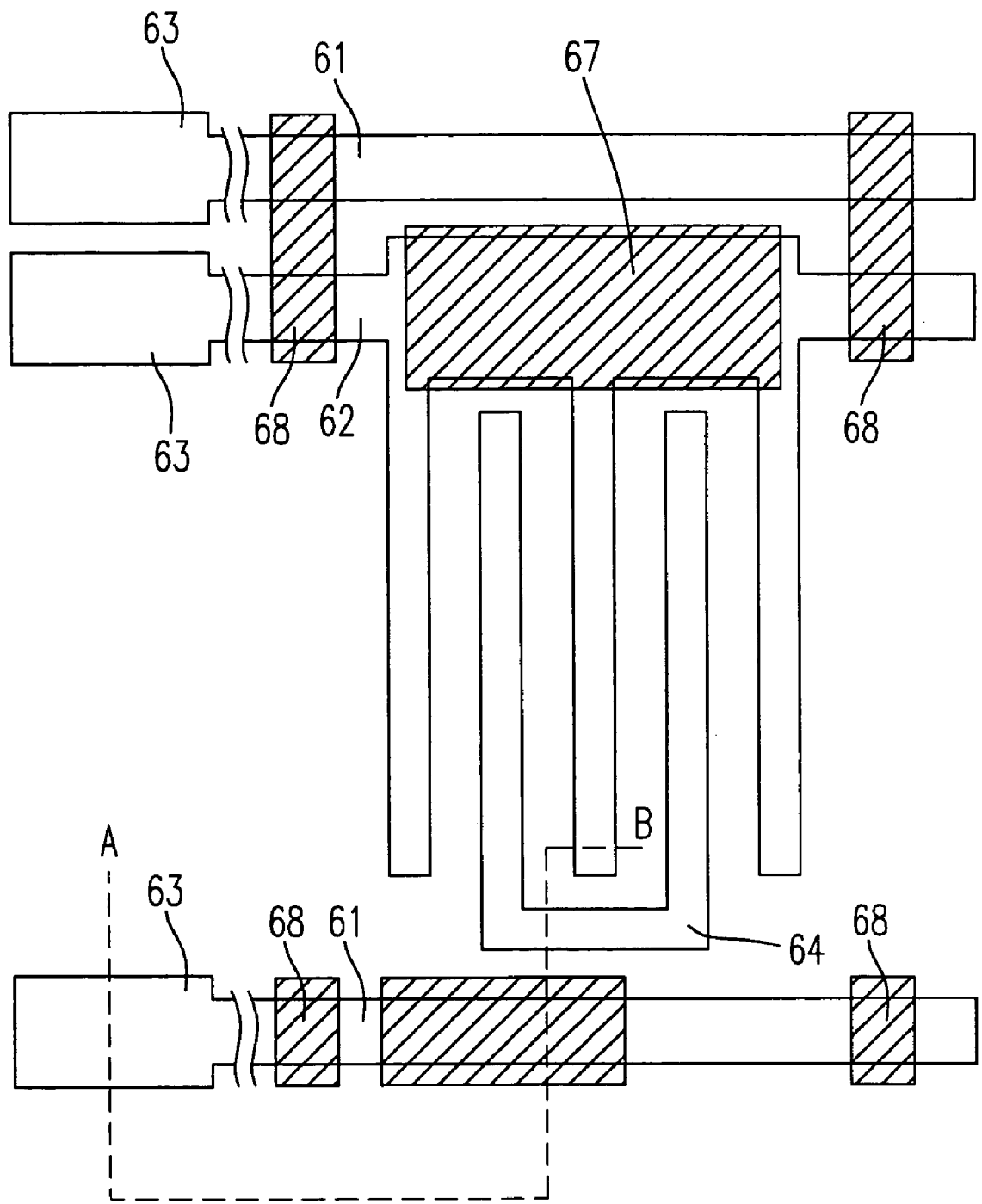
FIGS. 5(a)–(d) are diagrams illustrating the structures and manufacturing processes of the in-plane switching mode liquid crystal display (LCD) unit according to another preferred embodiment of the present invention.
Figure 5B:
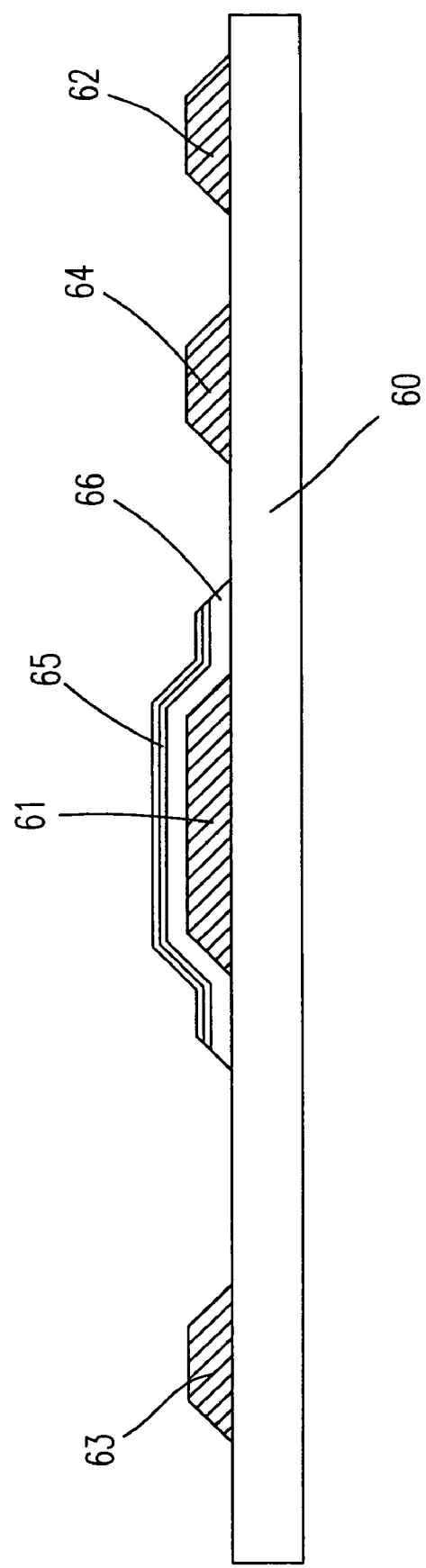
Figure 5C:
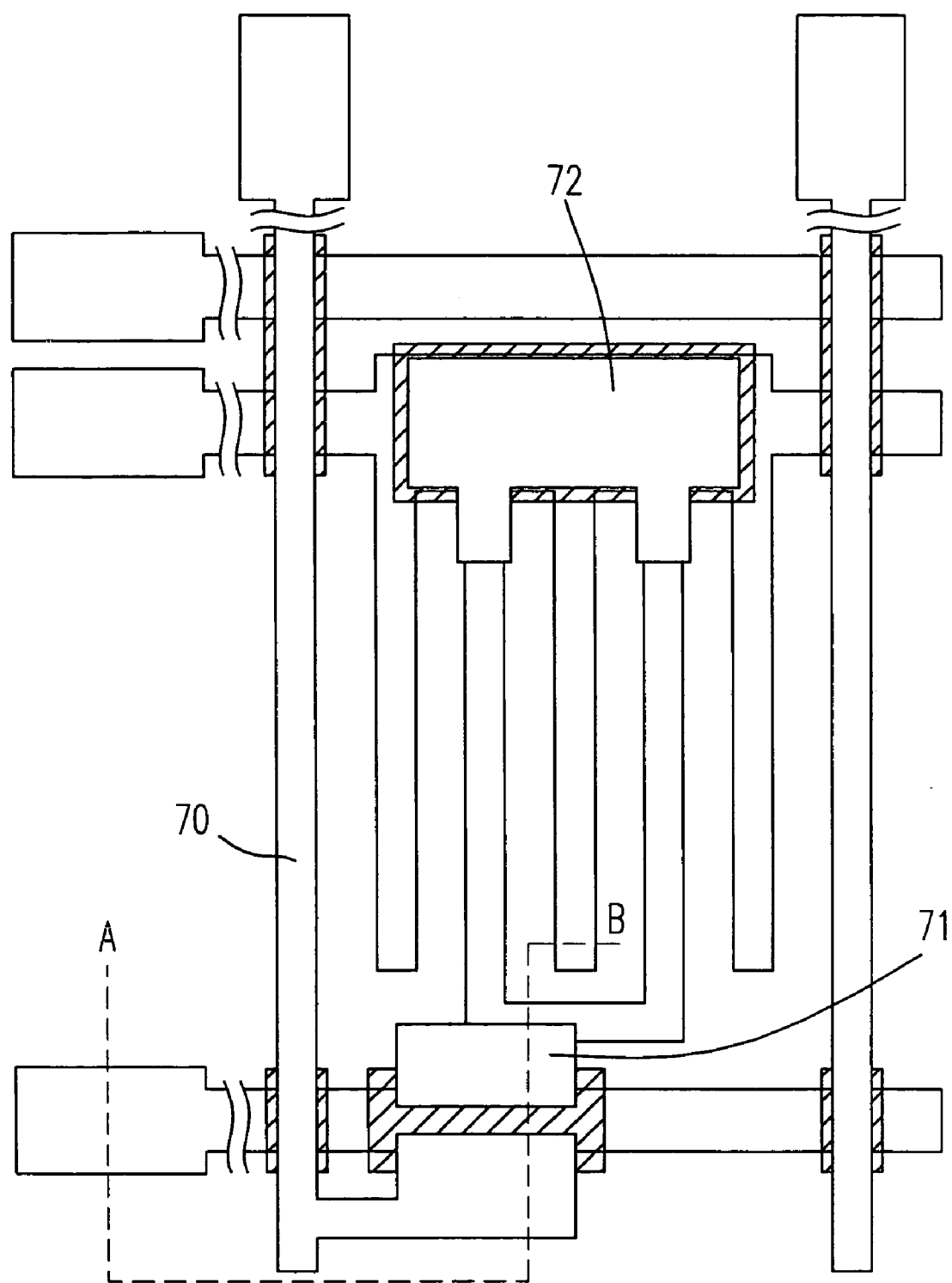
Figure 5D:
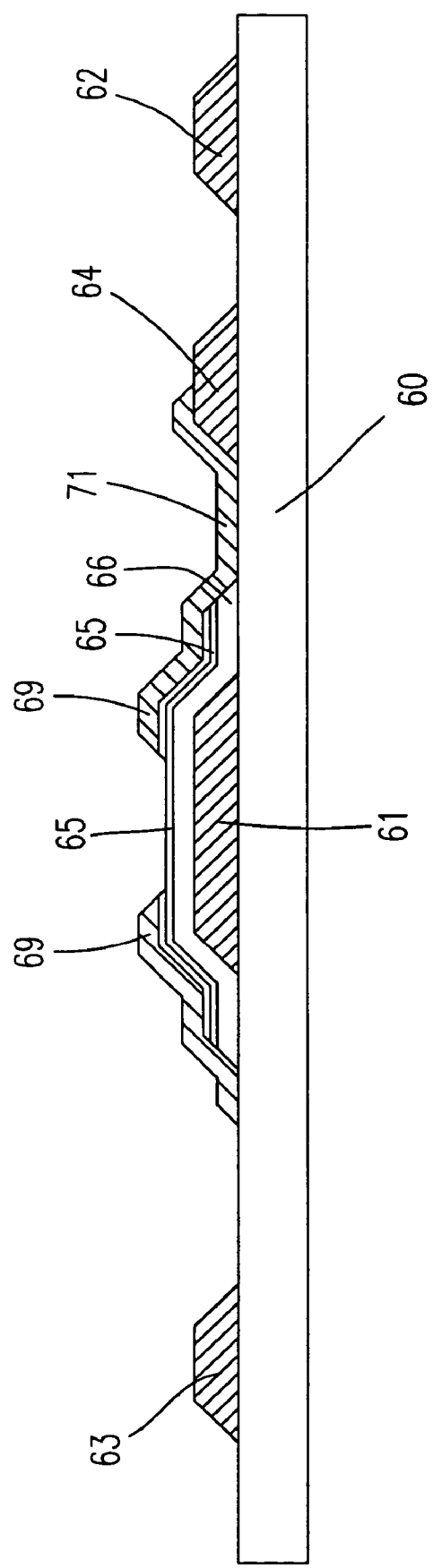

In another preferred embodiment of the present invention, the only differences compared to the previous embodiment are in the steps of the second and the third photo etching process, as shown in FIGS. 5(a)–(d). In FIG. 5(a), on the insulation substrate 60, a first conductive structure including a gate line structure 61, a comb-shaped common electrode structure 62, a wiring pad 63, and a comb-shaped pixel electrode 64 are defined by the first photo etching process (PEP). Afterwards, a gate insulation layer, a semi-conductive layer and a relatively high doped semi-conductive layer is formed on the insulation substrate 60 in sequence. Nevertheless, an intermediate structure including a channel structure 65, an insulation structure 66, a dielectric layer 67 for storing capacitance, and plural crossed-conductive line insulation structures 68 are defined by a second photo etching process (PEP). The dielectric layer 67 for storing capacitance covers the lower electrode which is disposed in the comb-shaped common electrode structure 62 for storing capacitance, as shown in FIGS. 5(a)–(b). In FIG. 5(c), after the second conductive layer is formed on the insulation substrate 60, a second conductive structure including a source/drain electrode structure 69 are defined on the relatively high doped semi-conductive layer. A data line 70, a connecting electrode 71, and an upper electrode 72 for storing capacitance are then defined by the third photo etching process (PEP). The data line 70 covers the crossed-conductive line insulation structure 68 and connects the drain electrode structure. The connecting electrode 71 is connected between the source electrode structure and the comb-shaped pixel electrode 64. The upper electrode 72 covers the dielectric layer 67 and connects the comb-shaped pixel electrode 64, as shown in FIGS. 5(c)–(d). The forming way of the passivation structure 53 is similar to that of the above-described embodiment of the present invention, and it is therefore not to be described repeatedly.

In the above preferred embodiments, the insulation substrate is a glass substrate pervious to light. As for the first conductive and the second conductive layer, which are made of the material selected from a group consisted of chromium, molybdenum, tantalum molybdate, tungsten molybdate, tantalum, aluminum, aluminum suicide, copper and the combination thereof. The gate insulation layer is made of the material selected from of a group consisted of silicon nitride ($SiN_X$), silicon oxide ($SiO_X$), silicon oxynitride ($SiO_XN_Y$), tantalum oxide ($TaO_X$), aluminum oxide ($AlO_X$) and the combination thereof The semi-conductive layer is made of the material selected from of a group consisted of intrinsic amorphous silicon, intrinsic micro-crystalline silicon, and intrinsic polycrystalline silicon. The relatively high doped semi-conductive layer is made of the material selected from of a group consisted of N-typed highly doped amorphous silicon, N-typed highly doped micro-crystalline silicon, P-typed highly doped micro-crystalline silicon, N-typed highly doped polycrystalline silicon, and P-typed highly doped polycrystalline silicon.

From the above description of the processing steps and the accomplished structures of the preferred embodiments, the two comb-shaped structures are mounted crossly and parallelly to each other at the plats with same altitudes, and additionally, in the same photo etching process. Therefore, since there is no altitude difference between the two comb-shaped electrodes, it will not result in the problem of misalignment. Besides, the needed steps of photo etching process (PEP) are reduced to four or even three steps. Indeed, the yield efficiency can be increased and the cost can be lower. Hence, the drawback of the conventional technique is improved and the main purpose of the present invention is achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method for liquid crystal display (LCD) unit, comprising the steps of:
    providing a substrate;
    forming a first conductive layer on said substrate;
    forming a first conductive structure comprising a gate line, a comb-shaped first electrode, a wiring pad, and a comb-shaped second electrode by etching said first conductive layer;
    forming an intermediate structure comprising a channel structure, an insulation structure, a dielectric layer for storing capacitance, and a plurality of crossed-conductive line insulation structures on said first conductive structure; and
    forming a second conductive structure comprising a source electrode, a drain electrode, a data line, a connecting electrode, and a first electrode for storing capacitance on said intermediate structure.

2. The manufacturing method according to claim 1, wherein said crossed-conductive line insulation structures is formed at the cross of said gate line, said comb-shaped first electrode and said data line.

3. The manufacturing method according to claim 1, wherein said data line covers said crossed-conductive line insulation structures, and connects said drain electrode.

4. The manufacturing method according to claim 1, wherein said connecting electrode connects said source electrode and said comb-shaped second electrode.

5. The manufacturing method according to claim 1, wherein said first electrode for storing capacitance covers said dielectric layer for storing capacitance, and connects said comb-shaped second electrode.

6. The manufacturing method according to claim 1, wherein said step of forming said intermediate structure further comprises a step of:
    forming a first insulation layer and a first semi-conductive layer on said a portion of said first conductive structure, wherein said intermediate structure is formed by patterning said first insulation layer, and said first semi-conductive layer.

7. The manufacturing method according to claim 1, wherein said step of forming said second conductive structure further comprises a step of:
    forming a second semi-conductive layer and a second conductive layer on said substrate, wherein said second conductive structure is formed by patterning said second semi-conductive layer and said second conductive layer.

8. The manufacturing method according to claim 7, wherein said second semi-conductive layer has relatively high doped than said first semi-conductive layer.

9. The manufacturing method according to claim 1, wherein said step of forming said intermediate structure further comprises a step of:
    forming a first insulation layer, a first semi-conductive layer and a second semi-conductive layer on said substrate, wherein said intermediate structure is formed by patterning said first insulation layer, said first semi-conductive layer and said second semi-conductive layer.

10. The manufacturing method according to claim 9, wherein said step of forming said second conductive structure further comprises a step of:
    forming a second conductive layer on said substrate, wherein said second conductive structure is formed by patterning said second semi-conductive layer and said second conductive layer.

11. The manufacturing method according to claim 10, wherein said second semi-conductive layer has relatively high doped than said first semi-conductive layer.

12. The manufacturing method according to claim 1 further comprising a step of forming a passivation structure on said substrate except partial region of said wiring pad.

13. The manufacturing method according to claim 12, wherein said step of forming said passivation structure further comprises a step of:
  forming a passivation layer on said substrate; and
  patterning said passivation layer to form said passivation structure, wherein said passivation structure having a wiring hole on said wiring pad.

14. The manufacturing method according to claim 12, wherein said step of forming said passivation structure further comprises a step of:
  forming said passivation structure on said substrate except partial region of said wiring pad by a mask deposition method to generate a wiring hole on said wiring pad.

15. A thin film transistor array substrate structure for liquid crystal display comprising:
  a substrate;
  a first conductive structure comprising a gate line, a comb-shaped first electrode, a wiring pad, and a comb-shaped second electrode;
  an intermediate structure on said first conductive structure comprising a channel structure, an insulation structure, a dielectric layer for storing capacitance, and a plurality of crossed-conductive line insulation structures; and
  a second conductive structure on said intermediate structure comprising a source electrode, a drain electrode, a data line, a connecting electrode, and a first electrode for storing capacitance, wherein said first conductive structure is formed by etching a first conductive layer on said substrate.

16. The thin film transistor array substrate structure according to claim 15, wherein said crossed-conductive line insulation structures is formed at the cross of said gate line, said comb-shaped first electrode and said data line.

17. The thin film transistor array substrate structure according to claim 15, wherein said data line covers said crossed-conductive line insulation structures, and connects said drain electrode.

18. The thin film transistor array substrate structure according to claim 15, wherein said connecting electrode connects said source electrode and said comb-shaped second electrode.

19. The thin film transistor array substrate structure according to claim 15, wherein said first electrode for storing capacitance covers said dielectric layer for storing capacitance, and connects said comb-shaped second electrode.

20. The thin film transistor array substrate structure according to claim 15 further comprising a passivation structure on second conductive structure except partial region of said wiring pad.

21. The thin film transistor array substrate structure according to claim 15, wherein said comb-shaped first electrode is cross and parallel with said comb-shaped second electrode.

22. The thin film transistor array substrate structure according to claim 15, wherein said comb-shaped first electrode is a common electrode.

23. The thin film transistor array substrate structure according to claim 15, wherein said comb-shaped second electrode is a pixel electrode.

24. The thin film transistor array substrate structure according to claim 15, wherein said intermediate structure is formed by patterning a first insulation layer, and a first semi-conductive layer.

25. The thin film transistor array substrate structure according to claim 15, wherein said second conductive structure is formed by patterning a second semi-conductive layer and a second conductive layer.

26. The thin film transistor array substrate structure according to claim 25, wherein said second semi-conductive layer has relatively high doped than said first semi-conductive layer.

27. The thin film transistor array substrate structure according to claim 15, wherein said intermediate structure is formed by patterning a first insulation layer, a first semi-conductive layer and a second semi-conductive layer.

28. The thin film transistor array substrate structure according to claim 27, wherein said second conductive structure is formed by patterning said second semi-conductive layer and a second conductive layer.

29. The thin film transistor array substrate structure according to claim 28, wherein said second semi-conductive layer has relatively high doped than said first semi-conductive layer.

* * * * *

UNITED STATES PATENT AND TRADEMARK OFFICE
CERTIFICATE OF CORRECTION

PATENT NO. : 7,045,373 B2
APPLICATION NO. : 10/850667
DATED : May 16, 2006
INVENTOR(S) : Po-Sheng Shih It is certified that error appears in the above-identified patent and that said Letters Patent is hereby corrected as shown below:

IN THE SPECIFICATIONS column 7, line 32, replace "suicide" with - - silicide - -.

column 7, line 37, add - - . - - between "thereof" and "The".

Signed and Sealed this

Fifth day of September, 2006

JON W. DUDAS
*Director of the United States Patent and Trademark Office*